(12) United States Patent
Galai et al.

(10) Patent No.: US 7,809,710 B2
(45) Date of Patent: Oct. 5, 2010

(54) SYSTEM AND METHOD FOR EXTRACTING CONTENT FOR SUBMISSION TO A SEARCH ENGINE

(75) Inventors: Yaron Galai, Rishon LeZion (IL); Oded Itzhak, Modi'in (IL)

(73) Assignee: Quigo Technologies LLC, New York, NY (US)

( * ) Notice: Subject to any disclaimer, the term of this patent is extended or adjusted under 35 U.S.C. 154(b) by 1298 days.

(21) Appl. No.: 10/486,196

(22) PCT Filed: Aug. 14, 2002

(86) PCT No.: PCT/IL02/00669

§ 371 (c)(1),
(2), (4) Date: Feb. 13, 2004

(87) PCT Pub. No.: WO03/017023

PCT Pub. Date: Feb. 27, 2003

(65) Prior Publication Data

US 2004/0177015 A1 Sep. 9, 2004

Related U.S. Application Data

(60) Provisional application No. 60/311,843, filed on Aug. 14, 2001, provisional application No. 60/312,061, filed on Aug. 15, 2001, provisional application No. 60/312,062, filed on Aug. 15, 2001, provisional application No. 60/318,671, filed on Sep. 13, 2001.

(51) Int. Cl.
*G06F 7/00* (2006.01)
*G06F 17/30* (2006.01)
*G06F 17/00* (2006.01)

(52) U.S. Cl. ........................ 707/709; 707/804; 707/810; 715/239

(58) Field of Classification Search ..................... 707/1, 707/3–6, 10, 709, 804, 810; 715/1, 234, 715/236, 239, 256, 500, 501.1, 753, 733, 715/810, 835
See application file for complete search history.

(56) References Cited

U.S. PATENT DOCUMENTS 4,683,202 A 7/1987 Mullis (Continued)

FOREIGN PATENT DOCUMENTS

EP 1024437 8/2000

(Continued)

OTHER PUBLICATIONS

Joo-Hwee Lim; "Learning Visual Keywords for Content-Based Retrieval"; IEEE; 1999; pp. 169-173.*

(Continued)

*Primary Examiner*—Ella Colbert
(74) *Attorney, Agent, or Firm*—Finnegan, Henderson, Farabow, Garrett & Dunner, L.L.P.

(57) ABSTRACT

A system and a method for automatically submitting Web pages to a search engine, which is preferably used for submitting dynamic Web pages, but may optionally be used for any type of Web page. The present invention features a gateway server for providing these Web pages to the search engine, either directly or optionally through an autonomous software search program. Optionally and more preferably, the gateway server modifies the Web page before serving it to the autonomous software search program and/or search engine.

4 Claims, 5 Drawing Sheets

U.S. PATENT DOCUMENTS

| | | | |
|---|---|---|---|
| 5,316,931 | A | 5/1994 | Donson et al. |
| 5,618,699 | A | 4/1997 | Hamamoto et al. |
| 5,737,734 | A * | 4/1998 | Schultz ........................... 707/5 |
| 5,796,952 | A | 8/1998 | Davis et al. |
| 5,802,518 | A * | 9/1998 | Karaev et al. ................... 707/9 |
| 5,819,271 | A * | 10/1998 | Mahoney et al. ............... 707/9 |
| 5,835,087 | A | 11/1998 | Herz |
| 5,835,712 | A | 11/1998 | DuFresne |
| 5,849,526 | A | 12/1998 | Pichersky |
| 5,870,559 | A | 2/1999 | Leshem et al. |
| 5,871,988 | A | 2/1999 | Croteau et al. |
| 5,895,470 | A | 4/1999 | Pirolli et al. |
| 5,891,697 | A | 5/1999 | Croteau et al. |
| 5,905,862 | A | 5/1999 | Hoekstra |
| 5,913,214 | A * | 6/1999 | Madnick et al. ................... 1/1 |
| 5,933,822 | A | 8/1999 | Braden-Harder et al. |
| 5,948,061 | A | 9/1999 | Merriman et al. |
| 5,958,008 | A | 9/1999 | Pogrebisky et al. |
| 5,983,237 | A | 11/1999 | Tain et al. |
| 5,987,457 | A | 11/1999 | Ballard |
| 6,035,332 | A | 3/2000 | Ingrassia, Jr. et al. |
| 6,044,376 | A | 3/2000 | Kurtzman, II |
| 6,078,866 | A | 6/2000 | Buck et al. |
| 6,078,916 | A | 6/2000 | Culliss |
| 6,169,986 | B1 | 1/2001 | Bowman et al. |
| 6,256,623 | B1 * | 7/2001 | Jones ................................ 1/1 |
| 6,256,633 | B1 | 7/2001 | Dharap |
| 6,269,361 | B1 | 7/2001 | Davis et al. |
| 6,308,202 | B1 | 10/2001 | Cohn et al. |
| 6,356,899 | B1 | 3/2002 | Chakrabarti et al. |
| 6,366,298 | B1 | 4/2002 | Haitsuka et al. |
| 6,370,527 | B1 | 4/2002 | Singhal |
| 6,434,561 | B1 * | 8/2002 | Durst et al. ................... 707/10 |
| 6,453,315 | B1 | 9/2002 | Weissman et al. |
| 6,523,026 | B1 | 2/2003 | Gillis |
| 6,526,440 | B1 | 2/2003 | Bharat |
| 6,668,256 | B1 | 12/2003 | Lynch |
| 6,704,727 | B1 | 3/2004 | Kravets |
| 6,754,873 | B1 | 6/2004 | Law et al. |
| 6,816,857 | B1 | 11/2004 | Weissman et al. |
| 6,876,997 | B1 | 4/2005 | Rorex et al. |
| 7,007,074 | B2 | 2/2006 | Radwin |
| 7,054,857 | B2 | 5/2006 | Cunningham et al. |
| 7,174,346 | B1 | 2/2007 | Gharachorloo et al. |
| 7,231,399 | B1 | 6/2007 | Bem et al. |
| 7,249,121 | B1 | 7/2007 | Bharat et al. |
| 7,689,684 | B2 * | 3/2010 | Donoho et al. .............. 709/224 |
| 7,698,427 | B2 * | 4/2010 | Lee et al. ..................... 709/226 |
| 2002/0010625 | A1 | 1/2002 | Smith et al. |
| 2002/0107735 | A1 | 8/2002 | Henkin et al. |
| 2002/0123912 | A1 | 9/2002 | Subramanian et al. |
| 2003/0009377 | A1 | 1/2003 | Asami et al. |
| 2003/0088554 | A1 | 5/2003 | Ryan et al. |
| 2004/0059708 | A1 | 3/2004 | Dean et al. |
| 2004/0172389 | A1 | 9/2004 | Galai et al. |
| 2004/0177015 | A1 | 9/2004 | Galai et al. |
| 2004/0181525 | A1 | 9/2004 | Itzhak et al. |
| 2004/0267725 | A1 | 12/2004 | Harik |
| 2005/0022115 | A1 * | 1/2005 | Baumgartner et al. ....... 715/513 |
| 2005/0065806 | A1 | 3/2005 | Harik |
| 2005/0149499 | A1 | 7/2005 | Franz et al. |
| 2005/0267872 | A1 | 12/2005 | Galai et al. |

FOREIGN PATENT DOCUMENTS

| | | |
|---|---|---|
| EP | 1030247 | 8/2000 |
| WO | WO 00/68839 | 11/2000 |
| WO | WO 0067159 | 11/2000 |
| WO | WO 00/75814 | 12/2000 |
| WO | WO 01/44992 | 6/2001 |
| WO | WO 02/37220 | 5/2002 |
| WO | WO 0241557 | 5/2002 |
| WO | WO 03/012576 | 2/2003 |
| WO | WO 03/017023 | 2/2003 |
| WO | WO 2004/010331 | 1/2004 |
| WO | WO 2004/111771 | 12/2004 |
| WO | WO 2005/119423 | 12/2005 |

OTHER PUBLICATIONS

"Inxight Offers New Information-Visualization Knowledge-Extraction Tools";2000; Internet Publishing Today; p. 1.*

Roelof Van Zwol and Peter M.G. Apers; "Modeling the webspace of an Intranet"; IEEE; 2000; pp. 260-269.* https://www.goggle.com/adsense/overview, "Unleash the full revenue potential of your website with Google Adsense", Jan. 14, 2004, 3 pages.

International Search Report for Application No. PCT/IL/02/00669, Jun. 11, 2003, 4 pages.

International Search Report for Application No. PCT/IL02/00616, Aug. 21, 2003, 4 pages.

International Search Report for Application No. PCT/IL03/00598, Nov. 5, 2003, 4 pages.

International Search Report for Application No. PCT/US05/018996, May 17, 2007, 3 pages.

Office Action dated Mar. 6, 2007 issued by USPTO in commonly-owned U.S. Pub. No. 2005/0267872, 11 pgs.

Search Report for commonly-owned European Patent Application No. 02755591.1, 5 pages.

Bharat K. et al.: "A technique for measuring the relative size and overlap of public Web search engines" Computer Networks and ISDN Systems, North Holland Publishing, Amsterdam, NL; vol. 30, No. 1-7, Apr. 1998, pp. 379-388.

Hirai J. et al.: "WebBase: a repository of Web pages" Computer Networks, Elsevier Science Publishers B.V., Amsterdam, NL; vol. 33, No. 1-6, Jun. 2000, pp. 277-293.

Final Office Action dated Sep. 4, 2007, in U.S. Appl. No. 10/069,686, 10 pages.

Non-Final Office Action dated Oct. 9, 2007, in U.S. Appl. No. 10/069,686, 10 pages.

Non-Final Office Action dated Mar. 26, 2008, in U.S. Appl. No. 10/069,686, 11 pages.

Final Office Action dated Sep. 16, 2008, in U.S. Appl. No. 10/069,686, 13 pages.

Non-Final Office Action dated Jan. 25, 2006, in U.S. Appl. No. 10/485,108, 19 pages.

Final Office Action dated Oct. 19, 2006, in U.S. Appl. No. 10/485,108, 8 pages.

Advisory Action dated Jan. 18, 2007, in U.S. Appl. No. 10/485,108, 3 pages.

Non-Final Office Action dated May 14, 2007, in U.S. Appl. No. 10/485,108, 8 pages.

Final Office Action dated Nov. 1, 2007, in U.S. Appl. No. 10/485,108, 8 pages.

Advisory Action dated Jan. 18, 2008, in U.S. Appl. No. 10/485,108, 3 pages.

Non-Final Office Action dated Nov. 17, 2008, in U.S. Appl. No. 10/485,108, 9 pages.

Final Office Action dated Apr. 21, 2009, in U.S. Appl. No. 10/485,108, 9 pages.

Non-Final Office Action dated Dec. 15, 2009, in U.S. Appl. No. 10/485,108, 9 pages.

Final Office Action dated Jul. 15, 2010, in U.S. Appl. No. 10/485,108, 9 pages.

Rong et al., "Narrowing the Semantic Gap-Improved Test-Based Web Document Retrieval Using Visual Features," IEEE Transactions on Multimedia, IEEE Service Center, Piscataway, NJ, US., vol. 4, No. 2, Jun. 2002.

Supplementary European Search Report dated Sep. 27, 2007, in EPO Application No. 03738477.3, 3 pages.

* cited by examiner

SYSTEM AND METHOD FOR EXTRACTING CONTENT FOR SUBMISSION TO A SEARCH ENGINE

RELATED PATENT APPLICATION

This application is a National Phase Application of PCT/IL02/00669 International Filing Date 14 Aug. 2002, which claims priority from U.S. Provisional Patent Application No. 60/311,843 filed 14 Aug. 2001, U.S. Provisional Patent Application No. 60/312,061 filed 15 Aug. 2001, U.S. Provisional Patent Application No. 60/312,062 filed 15 Aug. 2001, and U.S. Provisional Patent Application. No. 60/318,671 filed 13 Sep. 2001.

FIELD OF THE INVENTION

The present invention relates to a system and a method for extracting content from documents, and in particular, for such a system and method in which the documents are constructed as mark-up language documents, such as Web pages written in HTML (HyperText Mark-up Language), for submission to an autonomous software search program and/or search engine.

BACKGROUND OF THE INVENTION

The World Wide Web is structured as a "two-party" system, in which a first party, the computer user, receives content from a second party, the Web server. The user typically requests the content in the form of mark-up language documents, such as Web pages written in HTML. In order to retrieve the desired Web page, the user submits a particular URL (uniform resource locator) to the Web server, which retrieves and transmits the desired Web page to the computer of the user. However, the user must know the correct URL, or else the Web page cannot be retrieved.

Since there are many Web pages available through the World Wide Web, search engines have evolved to assist the user in the search for a particular Web page. These search engines index Web pages according to one or more keywords, such that when the user submits the query for a particular Web page, those Web page(s) with the same or similar keywords as for the query are retrieved. Search engines may receive Web pages (or pointers to those Web pages, such as URLs for example) by submission from the author of the page(s), but the search engines also actively search for new Web pages. Typically, such active searches are performed automatically with autonomous software programs called "spiders" or "crawlers".

These autonomous software programs search through the World Wide Web by extracting links from known Web pages in order to locate new Web pages, to which the links point. As each new Web page is located, it is indexed and added to the database of the search engine, and new links are extracted from that Web page. Search engines use the URL as a unique identifier of the indexed page. Thus, the autonomous software programs depend upon two assumptions. First, the Web pages existing as static entities, to which links remain stable. The second assumption is that web pages have incoming links pointing to them.

However, many Web pages today are provided as dynamic Web pages, which are created in real time or "on the fly" from a plurality of components stored in a database. Dynamic Web pages are created upon submission of a query by a user, which determines the identity of the components to be retrieved and assembled into the Web page. For example, a URL for a dynamic Web page, if it exists, may appear as follows: http://domain.com/search.asp?p1=v1&p2=v2. The term "search.asp" is a name of an application which should be invoked, followed by a "?" sign, and a list of parameters and their values. Many autonomous software search programs are designed to ignore such links, since automatically following this type of link may cause an infinite recursion which the autonomous software program cannot properly handle. Thus, dynamic Web pages are often not indexed (by using filters to reject such Web pages automatically during the indexing process), or even "un-indexable" due to the fact that the only way to generate this page is by submitting a query through a form and not through a regular hyperlink used by search engines to locate new pages.

Content from Web pages may be extracted for direct submission to a search engine, for example through a direct feed mechanism. Various search engines now receive data through such a direct mechanism, such as AltaVista™ for example. Typically, each such search engine has a specification for determining the format in which the data should be received. Most search engines require the data or "feeds" to be transferred as an extensible or extended markup language (XML) file, but other formats could also be used. Typically, the feeds include the following information per Web page: information that will be displayed in the search results: title, short description, link URL (the link behind the title) and display URL which appears under the description; and information that will be indexed but not displayed, such as meta keywords and the content of the page.

SUMMARY OF THE INVENTION

The background art does not teach or suggest a solution to the problem of enabling dynamic Web pages to be detected and indexed by autonomous software programs. The background art also does not teach or suggest a solution to the inability of such programs to easily analyze, parse and index dynamic Web pages. Also, the background art does not teach or suggest a solution to such problems as infinite recursion, which are detrimental to the operation of the autonomous software program.

The present invention overcomes these problems of the background art by providing a system and a method for automatically extracting content from a document such as a Web page, and for submitting such content to a search engine. The present invention is preferably used for submitting content from dynamic Web pages, but may optionally be used for any type of Web page. The present invention is also useful for any document which can be identified and/or located according to a URI (Unified Resource Identifier), which acts as an address or pointer to that document.

Hereinafter, the term "search engine" includes but is not limited to, any type of autonomous software search program, such as a "spider" for searching for Web pages through the World Wide Web for example, as well as any type of repository and/or database, or other archiving or storage-based software.

Examples of documents for which the URI may optionally be submitted include, but are not limited to, Web pages, any document written in any type of mark-up language, e-mail messages, word processing documents such as those generated by Microsoft Word™ (Microsoft Corp, USA) for example, and documents written in the PDF format (Adobe Systems Inc., USA).

According to a first embodiment of the present invention, a gateway server is optionally and preferably featured for providing the extracted content to the search engine, either directly or optionally through an autonomous software search program. Optionally and more preferably, the extracted content is from a Web page, and the gateway server modifies the Web page and/or the URL of the page before serving it to the autonomous software search program and/or search engine.

According to a second embodiment of the present invention, the content is preferably extracted from the Web page or other document by removing non-essential code information, such as non-essential HTML code for example. By "non-essential", it is meant that the code information is not related to the content itself. For example, for a dynamic Web page which is created according to a template, the non-essential code information preferably includes HTML code which is not part of the unique content of the page, such as copyright notice, advertisement and promotional text, site navigation links etc.

The removal of such non-essential code is preferably adjusted to a particular structure of Web pages or other type of document. Such a structure may optionally be found on a single Web site or other entity served by a particular Web server and/or dynamic Web page construction process or template. Such adjustment is most preferably performed by initially learning the structure of the Web pages, optionally by automatically scanning a plurality of Web pages produced with the same structure and/or by the same construction process. Such automatic scanning may also optionally include a statistical analysis of the Web pages, in order to infer extraction rules for such non-essential code. These extracting rules are optionally and more preferably based on statistical models, which determine the probability and/or the likelihood of a specific element of the page to be considered essential. As previously described, these Web pages may optionally have the same template, for example. The present invention then preferably detects repeated patterns in the Web page, more preferably by parsing the HTML code.

When this process is complete, a set of instructions is preferably produced to determine how repetitive elements and/or the template (or repeating elements) may be removed from the Web page, in order to extract only the unique information. These instructions are more preferably used for de-templating (removing non-essential code from) all of the Web pages with the same template and/or other similar structure before being indexed by the search engine.

According to another embodiment of the present invention, there is provided a system and a method for automatically extracting specific elements from the Web page, and constructing a structured representation of the information identified from the page. This process is preferably performed before the Web page is indexed by a search engine and/or is provided to an autonomous search software program, which then provides it to the search engine. The present invention identifies and extracts specific fields from the page, and preferably associates these fields with information types or attributes of information types that are defined in an information schema such as taxonomy or a semantic network. This schema optionally defines relations between different information types.

The system preferably assigns attributes to each field. For example an attribute can optionally be a weight factor that is used by the ranking algorithm of the search engine when sorting search results.

As for the previous embodiment, more preferably, the operation of the present invention is adjusted to a particular structure of Web pages, as may optionally be found on a single Web site or other entity served by a particular Web server and/or dynamic Web page construction process or template. Such adjustment is most preferably performed by initially learning the structure of the Web pages, optionally by automatically scanning a plurality of Web pages produced with the same or similar structure. As previously described, these Web pages may optionally have the same originating template and/or generated by the same construction process, for example. The present invention then learns how to detect and extracts specific elements, or fields, from the page, optionally assigning attributes to each field and optionally associating each field with an information object or an attribute of an information object defined in an information schema. Such a learning process may optionally be performed with a statistical analysis on the plurality of Web pages, in order to infer extraction rules for each of the fields. These extraction rules are optionally and more preferably based on statistical models, which determine the probability and/or the likelihood of a specific element of the page to be associated with each of the fields. The attributes of the fields are preferably defined either automatically or manually per set of pages that have the same or similar structure, and preferably derived from the information schema. As previously described, these Web pages may optionally have the same originating template and/or generated by the same construction process, for example.

The system then preferably constructs a structured representation of the fields that are extracted from the page including their attributes and the relations between them, optionally and more preferably in an XML format.

Any of the previous embodiments may optionally be implemented with an optional but preferred method according to the present invention for normalizing the URI of the document, such as the URL of a Web page for example. This exemplary method for normalizing the URL is preferably performed in order to index substantially similar Web pages only once. For each URL, each of the parameters is preferably removed. The term "parameter" refers to any divisible subunit of the URL. The Web page is then retrieved again by using the reduced URL. This Web page is then compared with the original Web page. If the removed parameter(s) are not redundant, such that they are required for the correct retrieval of the original Web page and/or a sufficiently similar Web page, then the retrieved Web page would be completely different from the original Web page.

If the parameter is redundant, the Web pages may be expected to be similar, although perhaps not completely identical. Lack of identity may occur if the Web page includes one or more links with the complete URL, as for a session identity (ID). Alternatively, the Web page could be custom tailored according to user identifying information, for personalization. Other types of dynamic Web pages may also occur, which may optionally produce a plurality of similar but not completely identical Web pages. For that reason, the comparison function of the present invention preferably checks for similarity in content and more preferably produces a similarity level, which is the likelihood of the two Web pages to have the same content. If this value exceeds a certain threshold, then most preferably the removed parameter is considered to be redundant.

According to preferred embodiments of the present invention, the level of similarity is determined according to visual similarity. Visual similarity is preferably determined according to two different types of parameters. A first type of parameter is based upon content of the document, such as text and/or images for example. A second type of parameter is based upon visual layout characteristics of the document, such as the presence of one or more GUI (graphical user interface) gadgets or the location of text and/or images, for example. More preferably, the level of similarity is determined by comparing content-based parameters between documents, rather than by comparing visual layout characteristics. The use of content-based parameters is preferred because similarity is preferably determined according to the actual content or "meaning" of a document, with regard to being submitted to a search engine and/or otherwise stored.

The above process preferably produces instructions on a process for detecting redundant parameters in URLs with the same structure, in order to remove these redundant parameters as the normalization instructions.

The above process is preferably executed once per URL structure, and the normalization instructions are then applied on each URL with the same structure. The term "URL structure" preferably includes the same parameters, repeated for each such structure. The redundant parameters are preferably removed automatically before the Web page is retrieved and indexed by the search engine.

According to the present invention, there is provided a method for providing a Web page to a search engine, comprising: separating non-essential code from essential content of the Web page; extracting the essential content from the Web page; and providing the essential content of the Web page to the search engine.

Preferably, extracting includes modifying the Web page by removing one or more links from the Web page. Additionally or alternatively extracting preferably includes modifying the Web page by changing a URL address by deleting, adding or modifying parameters within this URL. More preferably, the Web page is provided to an autonomous software search program, for being provided to the search engine.

Also more preferably, extracting further comprises: determining a pattern of at least one repetitive element within at least the Web page; and extracting the unique content from the Web page according to the pattern. Most preferably, the pattern is determined by comparing a plurality of Web pages. Optionally and most preferably, the pattern is a template.

Preferably, the unique content is extracted by removing the template.

Optionally and preferably, the separating non-essential code from essential content further comprises: normalizing the URL for the Web page for the search engine. More preferably, normalizing comprises removing at least one redundant parameter from the URL to form a normalized URL. Most preferably, all redundant parameters are removed. Optionally and most preferably, each redundant parameter is removed by: removing a parameter from the URL to form a reduced URL; retrieving a new Web page according to the reduced URL; and comparing the new Web page and the Web page to determine similarity, such that similarity indicates that the parameter is redundant.

Preferably, similarity is determined according to content of the new Web page and the Web page. More preferably, similarity is determined according to a quantitative comparison, such that if similarity is above a threshold, the parameter is redundant. Most preferably, the removal of parameters and the comparison of the content in order to determine redundancy of parameters are done either automatically or manually.

Optionally, separating further comprises: providing at least one attribute for an information type, the at least one attribute being determined according to an information schema; identifying at least one field of the Web page; and associating the at least one field with at least one attribute.

Preferably, the at least one attribute comprises a weight factor for ranking the Web page by the search engine.

Optionally and preferably, separating further comprises: examining a plurality of Web pages to perform a statistical analysis of the plurality of Web pages; and identifying at least one field of the Web page according to the statistical analysis.

According to another embodiment of the present invention, there is provided a system for providing a Web page for indexing, comprising: (a) a gateway Web server for modifying the Web page for enabling indexing to be performed; and (b) a search engine for performing indexing.

Preferably, the system features: (c) an autonomous software search program for requesting the Web page from the gateway Web server and for providing the Web page to the search engine.

More preferably, the system features: (d) a scheduling process for selecting a Web page to be served to the search engine. Optionally, the gateway Web server comprises the scheduling process.

Most preferably, the system further features (e) a plurality of Web servers for serving the Web page, wherein the scheduling process selects one of the plurality of Web servers for serving the Web page.

According to yet another embodiment of the present invention, there is provided a method for extracting unique content from a Web page, comprising: determining a pattern of at least one repetitive element within at least the Web page; and extracting the unique content from the Web page according to the pattern.

Preferably, the pattern is determined by comparing a plurality of Web pages. More preferably, the pattern is a template. Most preferably, the unique content is extracted by removing the template.

Optionally and preferably, the unique content is extracted before the Web page is provided to a search engine.

According to still another embodiment of the present invention there is provided a method for extracting an element from a Web page for serving the element to a search engine, the method comprising: analyzing a structure of the Web page; learning to extract the element from the Web page; producing a set of instructions to extract the element; extracting the element from a plurality of Web pages; and creating a structured representation of the content of the plurality of Web pages for submission to the search engine.

Preferably, analyzing is performed by automatically scanning a plurality of Web pages having at least a similar structure. More preferably, the at least a similar structure is determined according to at least one of an originating template and a construction process. Most preferably, the learning further comprises parsing the HTML code of the Web page.

Optionally, the structured representation is in XML.

According to yet other preferred embodiments of the present invention, there is provided a method for feeding information about a plurality of Web pages to a search engine, comprising: extracting at least one field from the plurality of Web pages; automatically generating feed information for being fed to the search engine from the at least one field; receiving information about a template common to the plurality of Web pages; merging the template with the feed information; and transmitting the feed information to the search engine.

Preferably, the at least one field comprises at least one of information to be displayed in a search result including one of the plurality of Web pages and information to be indexed but not displayed.

More preferably, the automatically generating feed information comprises: selecting an output format for generating the feed information; and constructing a script for generating the feed information according to the template. Most preferably, the output format comprises XML. Hereinafter, the term "computational device" refers to any type of computer hardware system and/or to any type of software operating system, or cellular telephones, as well as to any type of device having a data processor and/or any type of microprocessor, or any type of device which is capable of performing any function of a computer. For the present invention, a software application or program could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group. Hereinafter, the term "Web server" refers to a computer or other electronic device which is capable of serving files and data according to the HTTP protocol to a Web browser.

Hereinafter, the term "applet" refers to a self-contained software module written in an applet language such as Java or constructed as an ActiveX™ control. Hereinafter, the term "client" refers to any type of software program and/or code and/or other instructions which are operated and/or performed by the computational device of the user.

Hereinafter, the term "network" refers to a connection between any two or more computers which permits the transmission of data.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
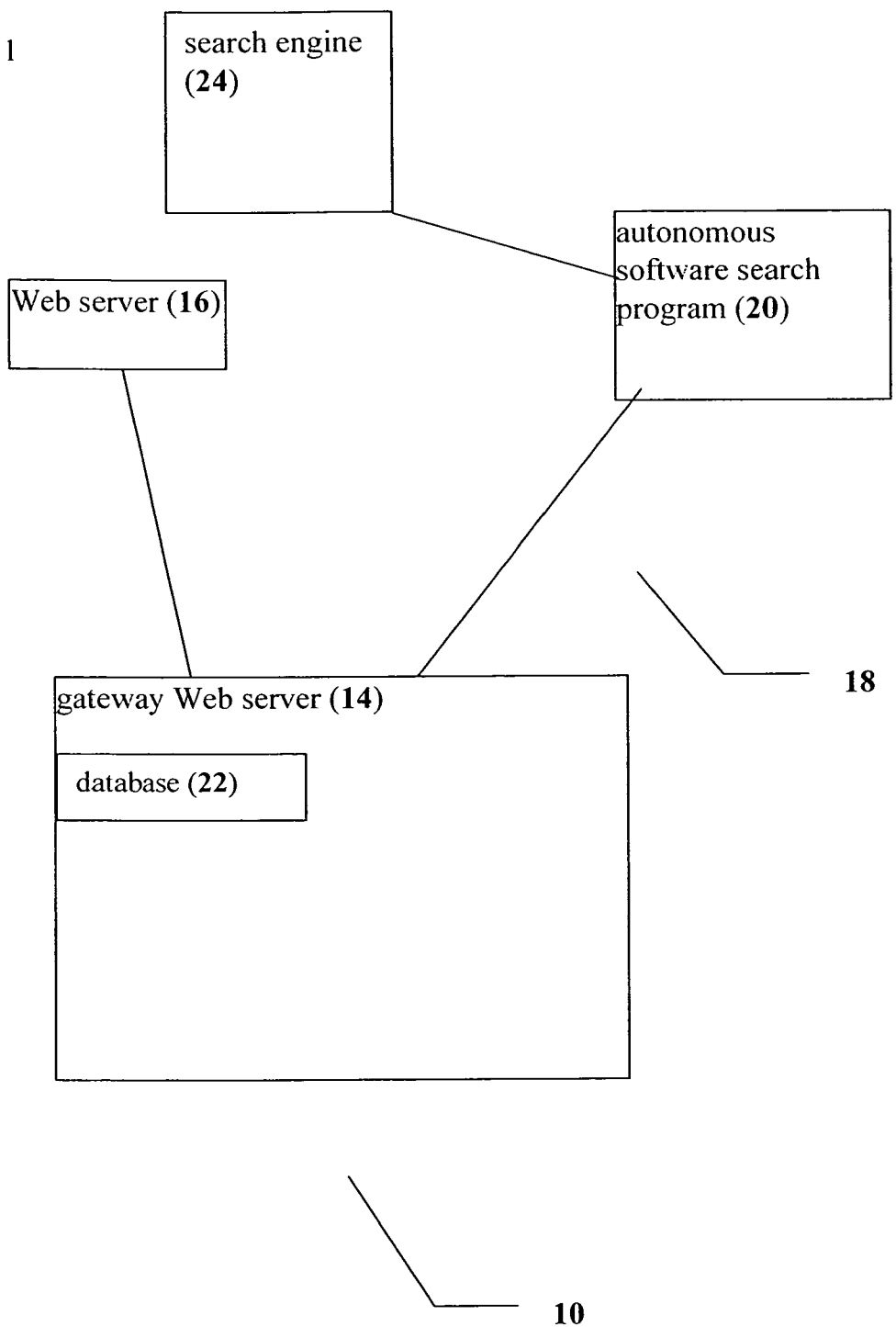
FIG. 1 is a schematic block diagram of an exemplary system according to the present invention for serving Web pages through a gateway.

The present invention is of a system and a method for automatically extracting content from a document such as a Web page, and for submitting such content to a search engine. The present invention is preferably used for submitting content from dynamic Web pages, but may optionally be used for any type of Web page. The present invention is also useful for any document which can be identified and/or located according to a URI (Unified Resource Identifier), which acts as an address or pointer to that document.

According to a first embodiment of the present invention, a gateway server is optionally and preferably featured for providing the extracted content to the search engine, either directly or optionally through an autonomous software search program. Optionally and more preferably, the extracted content is from a Web page, and the gateway server modifies the Web page and/or the URL of the page before serving it to the autonomous software search program and/or search engine.

According to preferred embodiments of the present invention, the Web page is modified by removing the template from the Web page. This process extracts the unique content from each Web page, thereby enabling the autonomous software search program and/or search engine to effectively ignore irrelevant content on each page when indexing the page, or preferably at least to not consider this content when indexing the Web page. It should be noted that such extracted content is sufficient for the search engine to index the Web page.

According to another optional but preferred embodiment of the present invention, more preferably all, but preferably at least a portion of, the links in the Web page are removed. Removal of such links may prevent the autonomous software search program from entering other Web pages, which may not be of interest and which may cause the autonomous software search program to enter a recursive loop. Such recursion may even be "infinite", in the sense that the autonomous software search program might enter a repetitive process and may even be unable to end the process.

According to a second embodiment of the present invention, the content is preferably extracted from the Web page or other document by removing non-essential code information, such as non-essential HTML code for example. By "non-essential", it is meant that the code information is not related to the content itself. For example, for a dynamic Web page which is created according to a template, the non-essential code information optionally and preferably includes HTML code which is not part of the unique content of the page, such as copyright notice, advertisement and promotional text, site navigation links etc, as well as GUI (graphical user interface) gadgets (portions of the display which are particular to the user interface).

The removal of such non-essential code is preferably adjusted to a particular structure of Web pages or other type of document. Such a structure may optionally be found on a single Web site or other entity served by a particular Web server and/or dynamic Web page construction process or template. Such adjustment is most preferably performed by initially learning the structure of the Web pages, optionally by automatically scanning a plurality of Web pages produced with the same structure. As previously described, these Web pages may optionally have the same template, for example.

The present invention then preferably detects repeated patterns in the Web page, more preferably by parsing the HTML code.

When this process is complete, a set of instructions is preferably produced to determine how repetitive elements and/or the template (or repeating elements) may be removed from the Web page, in order to extract only the unique information. These instructions are more preferably used for de-templating (removing non-essential code from) all of the Web pages with the same template and/or other similar structure before being indexed by the search engine.

According to preferred embodiments of the present invention, the Web page is modified by extracting only the unique content from the Web page, for example by removing the template information. This process extracts the unique content from each Web page, thereby enabling the autonomous software search program and/or search engine to index the most relevant content on each page. It should be noted that such extracted content is sufficient for the search engine to index the Web page.

According to another optional but preferred embodiment of the present invention, more preferably all, but preferably at least a portion of, the links in the Web page are removed. Removal of such links may prevent the autonomous software search program from entering other Web pages, which may not be of interest and which may cause the autonomous software search program to enter a recursive loop. Such recursion may even be "infinite", in the sense that the autonomous software search program might enter a repetitive process and may even be unable to end the process.

According to another embodiment of the present invention, there is provided a system and a method for automatically extracting specific elements from the Web page, and constructing a structured representation of the information identified from the page. This process is preferably performed before the Web page is indexed by a search engine and/or is provided to an autonomous search software program, which then provides it to the search engine. The present invention identifies and extracts specific fields from the page, and preferably associates these fields with information types or attributes of information types that are defined in an information schema such as taxonomy or a semantic network. This schema optionally defines relations between different information types.

The system preferably assigns attributes to each field. For example an attribute can optionally be a weight factor that is used by the ranking algorithm of the search engine when sorting search results.

As for the previous embodiment, more preferably, the operation of the present invention is adjusted to a particular structure of Web pages, as may optionally be found on a single Web site or other entity served by a particular Web server and/or dynamic Web page construction process or template. Such adjustment is most preferably performed by initially learning the structure of the Web pages, optionally by automatically scanning a plurality of Web pages produced with the same or similar structure. As previously described, these Web pages may optionally have the same originating template and/or may optionally be generated by the same construction process, for example. The present invention then learns how to detect and extracts specific elements, or fields, from the page, optionally assigning attributes to each field and optionally associating each field with an information object or an attribute of an information object defined in an information schema. The attributes of the fields are preferably defined either automatically or manually per set of pages that have the same or similar structure, and preferably are derived from the information schema. As previously described, these Web pages may optionally have the same originating template, for example.

The system then preferably constructs a structured representation of the fields that are extracted from the page including their attributes and the relations between them, optionally and more preferably in an XML format.

Any of the previous embodiments may optionally be implemented with an optional but preferred method according to the present invention for normalizing the URI of the document, such as the URL of a Web page for example. This exemplary method for normalizing the URL is preferably performed in order to index substantially similar Web pages only once. For each URL, each of the parameters is preferably removed. The term "parameter" refers to any divisible subunit of the URL. The Web page is then retrieved again by using the reduced URL. This Web page is then compared with the original Web page. If the removed parameter(s) are not redundant, such that they are required for the correct retrieval of the original Web page and/or a sufficiently similar Web page, then the retrieved Web page would be completely different from the original Web page.

If the parameter is redundant, the Web pages may be expected to be similar, although perhaps not completely identical. Lack of identity may occur if the Web page includes one or more links with the complete URL as for a session ID. Alternatively, the Web page could be custom tailored according to user identifying information, for personalization. Other types of dynamic Web pages may also occur, which may optionally produce a plurality of similar but not completely identical Web pages. For that reason, the comparison function of the present invention preferably checks for similarity in content and more preferably produces a similarity level, which is the likelihood of the two Web pages to have the same content. If this value exceeds a certain threshold, then most preferably the removed parameter is considered to be redundant.

According to preferred embodiments of the present invention, the level of similarity is determined according to visual similarity. Visual similarity is preferably determined according to two different types of parameters. A first type of parameter is based upon content of the document, such as text and/or images for example. A second type of parameter is based upon visual layout characteristics of the document, such as the presence of one or more GUI (graphical user interface) gadgets or the location of text and/or images, for example. More preferably, the level of similarity is determined by comparing content-based parameters between documents, rather than by comparing visual layout characteristics. The use of content-based parameters is preferred because similarity is preferably determined according to the actual content or "meaning" of a document, with regard to being submitted to a search engine and/or otherwise stored.

The above process preferably produces instructions on a process for detecting redundant parameters in URLs with the same structure, in order to remove these redundant parameters as the normalization instructions. The above process is preferably executed once per URL structure, and the normalization instructions are then applied executed for application to each URL with the same structure. The term "URL structure" preferably includes the same parameters. The redundant parameters are preferably removed automatically before the Web page is retrieved and indexed by the search engine.

The principles and operation of the method according to the present invention may be better understood with reference to the drawings and the accompanying description.

Referring now to the drawings, FIG. 1 shows an illustrative system 10 for providing Web pages to a search engine from a server, directly or through an autonomous software search program. A gateway Web server 14 is connected to a database 22 that contains information about pages stored in Web server 16 or in a multitude of web servers. Such information includes the URL of the pages and optionally additional information about the pages, such as a weight parameter, page impression frequency etc. For example, the weight parameter could optionally be an indication of popularity of each Web page. For each page request submitted by search engine 24, either directly or alternatively through an autonomous software search program 20, gateway server 14 obtains a single web page from a Web server 16 or from database 22. A scheduling process determines which page would be served and from which Web server 16 (if there is more than one). This scheduler (scheduling process) may optionally use the weight parameter, or the page impression parameter to determine which page to serve next. Gateway server 14 then retrieves the page from Web server 16 or from database 22 (optionally from a local cache (not shown)), and serves the Web page to search engine 24 for indexing. This Web page is preferably some type of Web page that search engines cannot normally access using an autonomous software search program 20 without using such a system, such as dynamic pages for example. Web server 16 serves such Web pages according to the HTTP (HyperText Transfer Protocol) protocol. Web server 16 is connected to gateway Web server 14 through a network 18. Network 18 may be the Internet, for example.

Gateway Web server 14 preferably features a database 22 for storing information about these Web pages or a copy of these pages. The Web pages are preferably modified before being placed in database 22 or before being served to the search engine/spider, such as autonomous search software program 20 or search engine 24 for example, by removing template-related problems from the Web page and/or by extracting specific elements from the Web page. This process extracts the unique content from the Web pages, thereby enabling autonomous software search program 20 and/or search engine 24 to access and index only the relevant content. It should be noted that such extracted content is sufficient for search engine 24 to index the Web page. Other page modifications may include adding of special tags in the HTML page for providing additional information about the Web page to search engine 24 (such as category of the page, popularity of the Web page etc.), modifying the title and description of the Web page and also modifying the URL of the page.

Gateway server 14 also filters out error pages and "404" pages in order to prevent search engine 24 from indexing them.

According to another optional but preferred embodiment of the present invention, more preferably all, but preferably at least a portion of, the links in the Web page are removed. Removal of such links may prevent autonomous software search program 20 from entering other Web pages, which may not be of interest or which may cause autonomous software search program 20 to enter a recursive loop. Such recursion may even be "infinite", in the sense that autonomous software search program 20 might enter a repetitive process and may even be unable to end the process.

Optionally and more preferably, autonomous software search program 20 is able to query gateway Web server 14 in order to obtain one or more additional Web pages for indexing. Most preferably, gateway Web server 14 stores information about Web pages which have already been provided to each specific autonomous software search program 20, in order to be able to provide new Web page(s) upon receiving each query from autonomous software search program 20.

Figure 2:
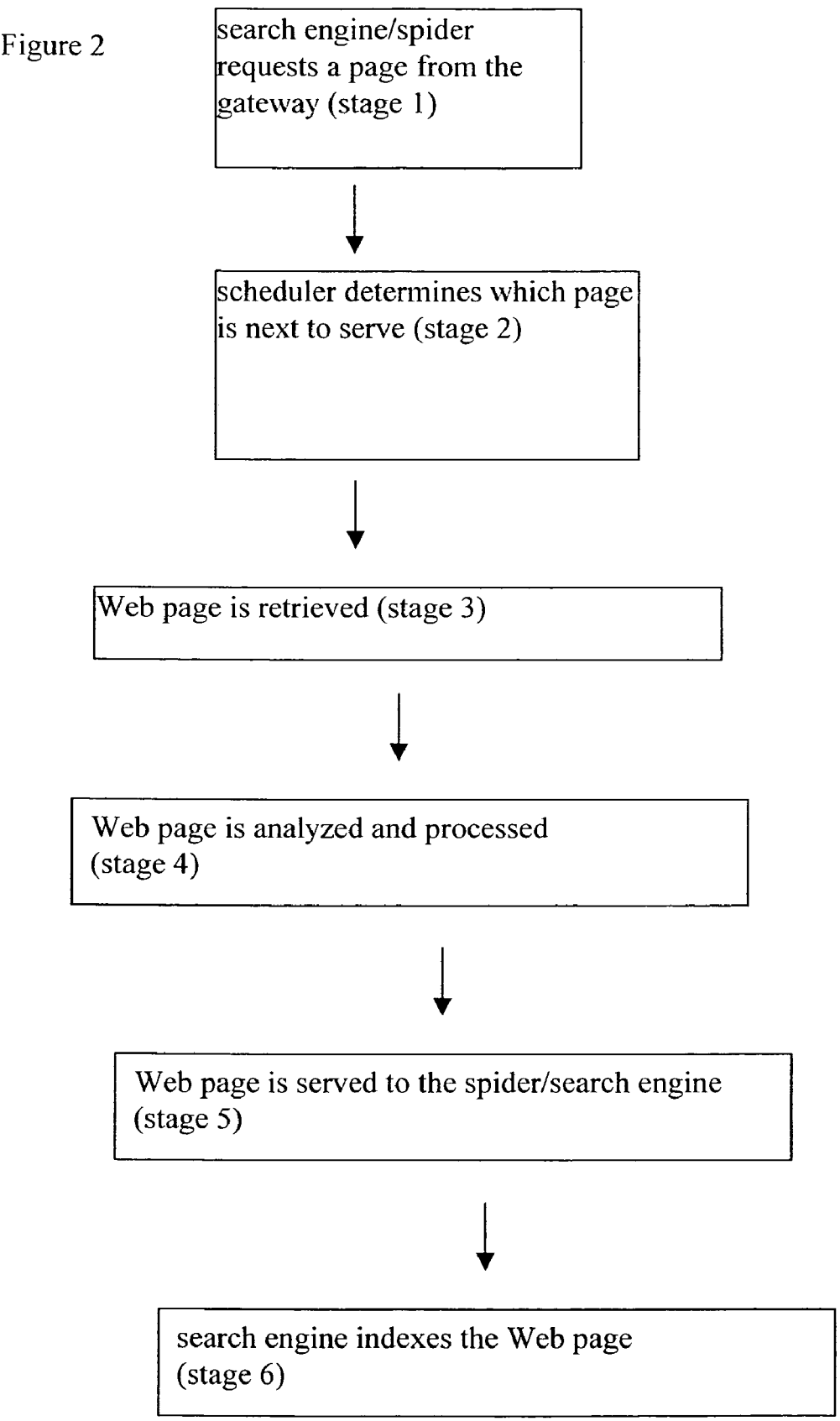
FIG. 2 is a flowchart of an exemplary method according to the present invention for operating the system of FIG. 1.

FIG. 2 is a flowchart of an exemplary method for providing Web pages to an autonomous software search program and/or search engine. As shown, in stage 1, the search engine/spider requests a page from the gateway. Next, in stage 2, the scheduler determines which page is next to serve. In stage 3, the Web page is retrieved from web server or local cache. In stage 4, the Web page is analyzed and processed. This process may optionally include any one or more of the following actions: removing the template information, extracting specific textual elements from the Web page, adding information to the Web page, removing links, and optionally modifying Web page or page URL. Next, in stage 5, Web page is served to the spider/search engine over HTTP protocol. In stage 6, the search engine indexes the page.

Figure 3:
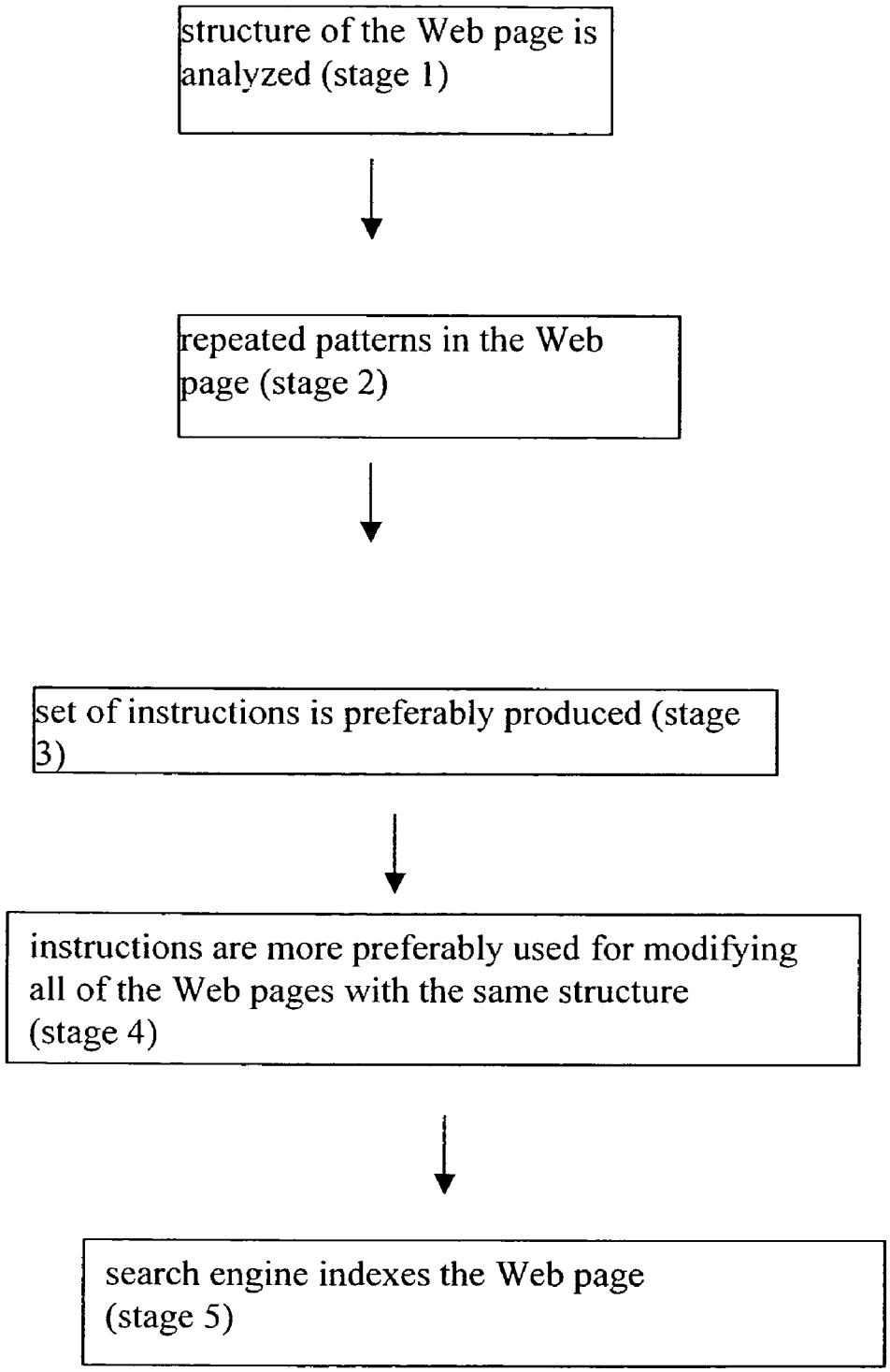
FIG. 3 shows a flowchart of an exemplary method for extracting the unique content from a Web page according to the present invention.

FIG. 3 shows a flowchart of an exemplary method for extracting the unique content from a Web page, for example in order to serve the Web page to a search engine and/or autonomous search software program for indexing. This process is preferably invoked by an autonomous software search program and/or search engine for indexing the Web page, although alternatively the process could optionally be performed before such a request is received.

As shown, in stage 1, the structure of the Web page is analyzed, optionally by automatically scanning a plurality of Web pages produced with the same structure. As previously described, these Web pages may optionally have the same template and/or generated by the same construction process, for example. The present invention then detects repeated patterns in the Web page, more preferably by parsing the HTML code, in stage 2.

When this process is complete, a set of instructions is preferably produced to determine how repetitive elements and/or the template (or repeating elements) may be removed from the Web page, in order to extract only the unique information, in stage 3. These instructions are more preferably used for de-templating all of the Web pages with the same template and/or other similar structure before being indexed by the search engine, in stage 4.

The unique content is preferably extracted automatically before the Web page is retrieved and indexed by the search engine in stage 5.

Figure 4:
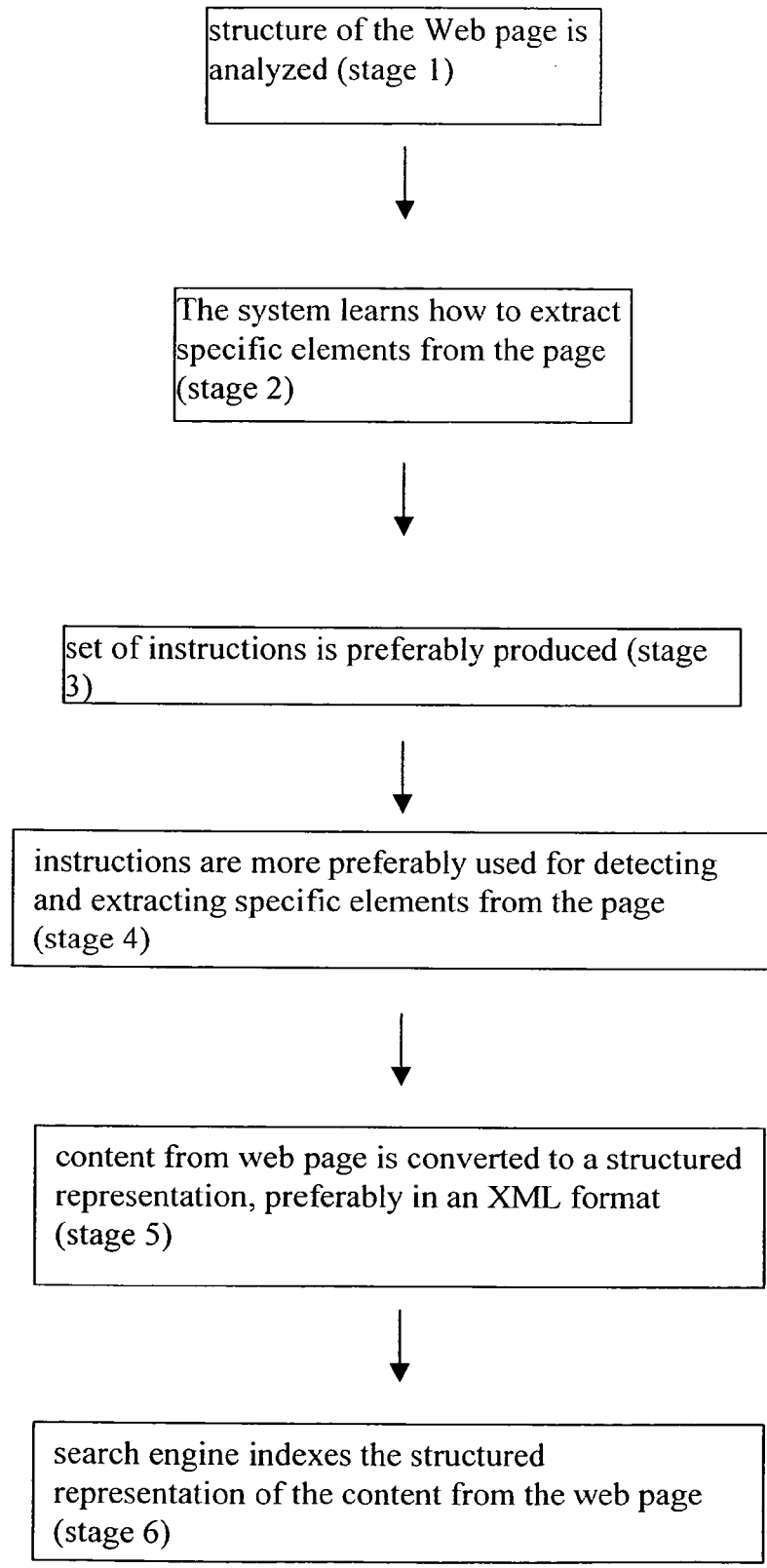
FIG. 4 shows a flowchart of an exemplary method according to the present invention for extracting elements, or fields, from a Web page and constructing a structured representation of that information.

FIG. 4 shows a flowchart of an exemplary method for extracting elements, or fields, from a Web page and constructing a structured representation of that information, for example in order to serve it to a search engine and/or autonomous search software program for indexing.

As shown, in stage 1, the structure of the Web page is analyzed, optionally by automatically scanning a plurality of Web pages produced with the same or similar structure. As previously described, these Web pages may optionally have the same originating template, for example. The present invention then learns how to detect and extract specific elements, or fields, from the Web page, more preferably by parsing the HTML code (stage 2).

When this process is complete, a set of instructions is preferably produced to determine how specific elements from the Web page can be detected, in order to extract them (stage 3). These instructions more preferably relate to all of the Web pages originating from the same template and/or have a similar structure.

The set of instructions from stage 3 is used to detect and extract elements automatically in stage 4. These elements are used to create a structured representation of the content of the page, preferably in an XML format, in stage 5. This structure representation is served to a search engine, optionally using an autonomous software program, for indexing in stage 6.

Figure 5:
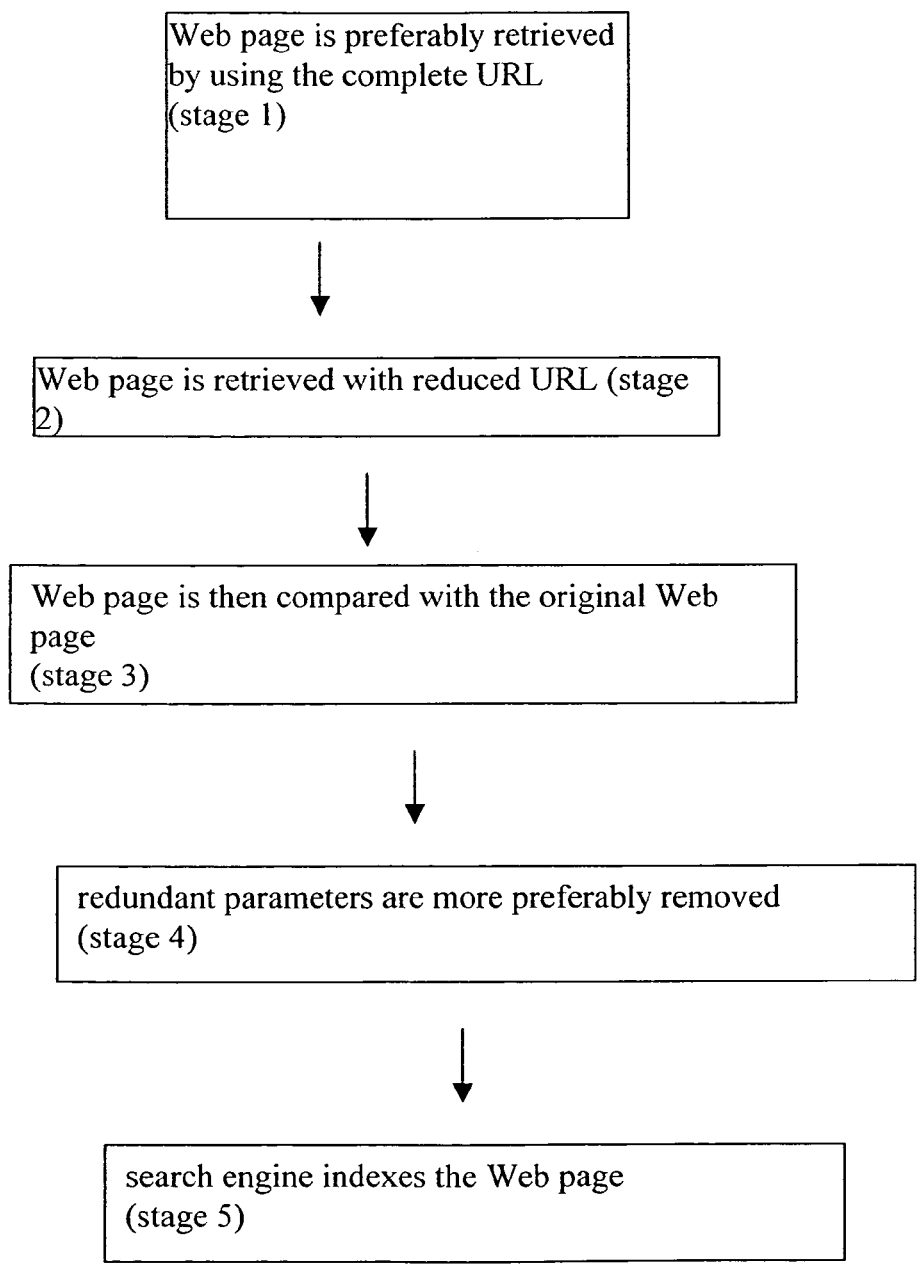
FIG. 5 shows a flowchart of an exemplary method for normalizing a URI according to the present invention.

FIG. 5 shows a flowchart of an exemplary method for normalizing a URI, such as the URL of a Web page for example. Such normalization is optionally and preferably performed before the Web page or other document is submitted to the search engine and/or autonomous search software program for indexing as previously described. This process is optionally and preferably invoked by the autonomous software search program and/or search engine in order to decide whether, and optionally when, this Web page was previously indexed. The process is also preferably used to help the autonomous software search program and/or search engine to decide whether the Web page should be retrieved, for example for indexing.

As shown, in stage 1, the Web page is preferably retrieved by using the complete URL to form an original Web page. In stage 2, each of the parameters is preferably removed and the Web page is retrieved again by using the reduced URL. The term "parameter" refers to any divisible subunit of the URL. In stage 3, this Web page is then compared with the original Web page. If the removed parameter(s) are not redundant, such that they are required for the correct retrieval of the original Web page, then the retrieved Web page would be completely different from the original Web page.

If the parameter is redundant, the Web pages may be expected to be similar, although perhaps not completely identical. Lack of identity may occur if the Web page includes one or more links with the complete URL, as for a session ID. Alternatively, the Web page could be custom tailored according to user identifying information, for personalization. For that reason, the comparison function of the present invention preferably checks for similarity in content and more preferably produces a similarity level, which is the likelihood of the two Web pages to have the same content. If this value exceeds a certain threshold, then most preferably the removed parameter is considered to be redundant.

According to preferred embodiments of the present invention, the level of similarity is determined according to visual similarity. Visual similarity is preferably determined according to two different types of parameters. A first type of parameter is based upon content of the document, such as text and/or images for example. A second type of parameter is based upon visual layout characteristics of the document, such as the presence of one or more GUI (graphical user interface) gadgets or the location of text and/or images, for example. More preferably, the level of similarity is determined by comparing content-based parameters between documents, rather than by comparing visual layout characteristics. The use of content-based parameters is preferred because similarity is preferably determined according to the actual content or "meaning" of a document, with regard to being submitted to a search engine and/or otherwise stored. The above process preferably produces instructions on a process for detecting redundant parameters in URLs with the same structure, in order to remove these redundant parameters as the normalization instructions. The above process is preferably executed once per URL structure, and the normalization instructions are then applied to each URL with the same structure. The term "URL structure" preferably includes any part of a URL having the same parameters, repeated for each such structure. Therefore, stages 1-3 are optionally and preferably repeated for each URL structure. Once a parameter and/or a URL structure has been identified as occurring repeatedly, optionally and preferably, stages 1-3 are not performed again for such repeated parameters and/or URL structures.

In stage 4, these redundant parameters are more preferably removed. The redundant parameters are preferably removed automatically before the Web page is retrieved and indexed by the search engine in stage 5.

According to other optional but preferred embodiments of the present invention, one or more methods that are described above can also optionally be used for a "feed" mechanism to a search engine. Each search engine that operates a feed program has a particular specification according to which the information about Web pages is to be transmitted to that search engine for the "feed". Most search engines require the information to be transmitted as an XML file but optionally other formats could be used.

Preferably, the method is performed as follows. First, preferably one or more fields are extracted from the Web pages such as book title, author, price, and review for example, more preferably according to the methods of FIG. 3 or 4.

The information which is to be extracted optionally and preferably includes information that is to be displayed in the search results, such as title, short description, link URL (the link behind the title) and display URL, which appears under the description; and/or information that is be indexed but not displayed, such as meta keywords and the content of the page.

Next, the feed information is preferably automatically generated by using the extracted fields from each page. In order for such automatic generation to occur, the user preferably selects that output format, after which the user writes a template script that describes how to generate each feed element. For example, a template script for a page title may look like this: Buy $doc.title by $doc.author for only $doc.price Next, preferably all of the Web pages which belong to a collection are examined, for merging the template with the actual fields that were extracted from each document.

Next, optionally and preferably the user is able to apply functions on the fields, such as convert to lower case, remove spaces, extract sub strings etc.

Next, the feed information is preferably generated according to the template and is then sent to the search engine for example, through an ftp upload, email, or any other type of transmission mechanism.

While the invention has been described with respect to a limited number of embodiments, it will be appreciated that many variations, modifications and other applications of the invention may be made.

What is claimed is:

1. A method of extracting a content from a Web page, wherein the extracted content is sufficient for a search engine to index said Web page, said method comprising:
   identifying by a server a template of the Web page, wherein said template includes a non-essential code;
   extracting by said server a content, other than the identified template from said Web page; separating, by said server, a link from the content of the Web page; and,
   providing by said server said extracted content for receipt by said search engine.

2. A method of extracting a content from a Web page, wherein the extracted content is sufficient for a search engine to index said Web page, said method comprising:

identifying by a server a template of the Web page, wherein said template includes a non-essential code;

extracting by said server a content, other than the identified template from said Web page; producing a set of instructions for removing the template from the Web page; and, providing by said server said extracted content for receipt by said search engine.

3. The method of claim 2, further comprising extracting a field of data from the Web page and associating the field with an attribute defined by an information schema.

4. The method of claim 2 further comprising receiving by said search engine said extracted content for indexing.

\* \* \* \* \*